US012654392B2

(12) United States Patent
Zhang et al.

(10) Patent No.: US 12,654,392 B2
(45) Date of Patent: Jun. 16, 2026

(54) PRINTHEAD WITH INTERNAL MICROFLUIDIC CHANNELS

(71) Applicant: Shanghai Aurefluidics Technology Co., Ltd, Shanghai (CN)

(72) Inventors: Yi Zhang, Shanghai (CN); Yimin Guan, Shanghai (CN)

(73) Assignee: Shanghai Aurefluidics Technology Co., Ltd, Shanghai (CN)

( * ) Notice: Subject to any disclaimer, the term of this patent is extended or adjusted under 35 U.S.C. 154(b) by 199 days.

(21) Appl. No.: 18/575,329

(22) PCT Filed: Jul. 4, 2022

(86) PCT No.: PCT/CN2022/103715
§ 371 (c)(1),
(2) Date: Feb. 20, 2024

(87) PCT Pub. No.: WO2023/280120
PCT Pub. Date: Jan. 12, 2023

(65) Prior Publication Data
US 2024/0316863 A1     Sep. 26, 2024

(30) Foreign Application Priority Data
Jul. 7, 2021    (CN) ......................... 202110765475.X

(51) Int. Cl.
| | |
|---|---|
| *B29C 64/209* | (2017.01) |
| *B33Y 30/00* | (2015.01) |
| *B41J 2/01* | (2006.01) |
| *B41J 2/175* | (2006.01) |

(52) U.S. Cl.
CPC ............... B29C 64/209 (2017.08); B41J 2/01 (2013.01); B41J 2/175 (2013.01); B33Y 30/00 (2014.12)

(58) Field of Classification Search
CPC ........ B29C 64/209; B29C 64/112; B41J 2/01; B41J 2/175; B33Y 30/00; G01N 2035/1041
USPC ........................................... 347/56
See application file for complete search history.

(56) References Cited

U.S. PATENT DOCUMENTS

| | | | |
|---|---|---|---|
| 2005/0168520 A1* | 8/2005 | Mantooth .................. | B41J 2/20 |
| | | | 347/30 |
| 2023/0415485 A1* | 12/2023 | Orihara ................ | B41J 2/17513 |

* cited by examiner

*Primary Examiner* — Jason S Uhlenhake
*Assistant Examiner* — Alexander D Shenderov
(74) *Attorney, Agent, or Firm* — IPRTOP LLC

(57) ABSTRACT

A printhead is provided, where the printhead includes a printing base and a printing chip, the printing base includes a fluid inlet channel, a fluid outlet channel, and a storage slot, and the fluid inlet channel and the fluid outlet channel are communicated with the storage slot; the printing chip is encapsulated on a surface of the printing base, and communicated with the storage slot to form an internal microfluidic channel. The internal microfluidic channel allows old printing liquid to be entirely discharged in one go, reducing the risk of contamination, and making it easier to discharge printing liquid. The internal microfluidic channel has a small holding volume, leading to substantial cost savings; a one-way flow path between the inlet and outlet is established, and the high pressure and rapid flow within the path enhance the fluid discharge rate.

12 Claims, 6 Drawing Sheets

PRINTHEAD WITH INTERNAL MICROFLUIDIC CHANNELS

FIELD OF THE INVENTION

The present disclosure generally relates to the technical field of bioprinting devices and, in particular, to a printhead including an internal microfluidic channel.

BACKGROUND OF THE INVENTION

Biological 3D printing is a process that uses 3D printing principles and techniques to transform biological materials, such as natural or synthetic biological substances or cell suspensions, into specifically designed three-dimensional structures. Unlike conventional 3D printing, biological 3D printing creates biological tissues or organs that retain certain biological functions. These printed structures provide the necessary conditions for the further growth of cells and tissues. Due to these unique characteristics, biological 3D printing faces numerous specific technical challenges during its development. Within the realm of biological 3D printing, there's a technique known as cellular 3D printing, which uses cells as the printing material. This process involves creating a biological ink composed of cells and biocompatible materials. The printhead moves and sprays out this biological ink, and the movement of the printhead is controlled by a software program, which directs the biological ink to print according to a predetermined pattern. This allows the formation of a three-dimensional structure that matches a digital model of a to-be-printed object.

In related technologies, printers, including both extrusion and non-contact types, utilize a printhead with an open inlet, as shown in FIG. 1, which facilitates the addition of liquid using a pipette. However, this design presents a challenge, that is, over time, the cell suspension will experience sedimentation due to gravity. Once the cell suspension settles, it necessitates manual removal, a task that demands a high level of skill from the operator and is time-consuming. Furthermore, the small size of the open inlet inside the printhead makes it difficult for the pipette to completely remove all the liquid, leading to a higher risk of cell suspension contamination.

Therefore, there is a need to provide an improved technical solution to address the shortcomings of the related technologies.

SUMMARY OF THE INVENTION

In view of the shortcomings of the related technologies, the present disclosure provides a printhead including an internal microfluidic channel, for addressing issues prevalent in the related technologies where the use of an open printhead leads to sedimentation of cell suspensions over time due to gravity, and the sedimentation makes it challenging to remove the settled solution, leading to a higher risk of cell suspension contamination.

For the above and other related purposes, the present disclosure provides a printhead including an internal microfluidic channel, and the printhead includes:

a printing base, including a fluid inlet channel, a fluid outlet channel, and a storage slot, wherein the fluid inlet channel and the fluid outlet channel are in communication with the storage slot; and a printing chip, wherein the printing chip is encapsulated on a first surface of the printing base, and the printing chip is communicated with the storage slot to form the internal microfluidic channel, and a holding volume of the internal microfluidic channel is equal to a volume of printing liquid loaded into the printhead for one charge.

Preferably, the printing base further includes a waste tank communicated with the fluid outlet channel, the waste tank is disposed on a second surface of the printing base opposite to the first surface.

Preferably, the fluid inlet channel is located outside of the waste tank and the fluid outlet channel is located inside of the waste tank.

Preferably, the holding volume of the internal microfluidic channel ranges from 10 μL to 30 μL.

Preferably, the printing chip is a rectangular sheet, the printing chip includes a first surface and a second surface opposite to the first surface, a chip inlet port is formed on the first surface of the printing chip and extends along a length direction of the printing chip, and the chip inlet port is communicated with the internal microfluidic channel; wherein a plurality of spray holes are formed on the second surface of the printing chip, arranged in a row at equal spacing along the length direction, and communicated with the chip inlet port; wherein printing liquid in the internal microfluidic channel arrives at the plurality of spray holes after flowing through the chip inlet port.

Preferably, the printing chip is a thermal bubble inkjet printing chip.

Preferably, the fluid inlet channel has a circular inlet port with a diameter of 0.5 mm to 1.5 mm.

Preferably, the fluid inlet channel is connected to a pipette for manual filling, or the fluid inlet channel is connected to a liquid supply system, and the liquid supply system is electrically connected to a controller, the controller is configured to control automatic filling of the fluid inlet channel by the liquid supply system.

Preferably, the fluid inlet channel has a funnel-shaped inlet port with a cylindrical upper part and a conical lower part.

Preferably, the fluid inlet channel is connected to the pipette for manual filling.

As described above, the present disclosure has the following advantages:

the printhead of the present disclosure contains an internal microfluidic channel formed between the printing chip and the storage slot, and the holding volume of the internal microfluidic channel is equal to a volume of printing liquid loaded into the printhead for one charge. This design ensures that during the fluid discharge process, the old printing fluid is expelled entirely in one go, significantly reducing the chance of contamination, and reducing the difficulty of discharging the printing fluid from the printing base. Moreover, the small holding volume of the internal microfluidic channel prevents wastage of printing fluid, leading to substantial cost savings.

In the present disclosure, the fluid inlet channel is connected to the pipette or the liquid supply system for manual filling or automatic filing of liquid, so that a one-way flow path is formed between the fluid inlet channel and the fluid outlet channel. Once the printing fluid is initially added, the printer commences its operation. However, after a certain duration, the printing fluid, such as a cell suspension, within the printhead begins to settle, rendering it unsuitable for printing. After new printing fluid is subsequently added, the high pressure and rapid flow within this one-way path enhance the fluid discharge rate, due to the relatively small cross-sections of the one-way flow path between the inlet and outlet channels. The present disclosure also addresses issues prevalent in the related technologies where the use of an open printhead leads to sedimentation of cell suspensions over time due to gravity, and the sedimentation makes it difficult and time-consuming to remove the settled solution with a pipette, and furthermore, the small size of the open inlet inside the printhead makes it difficult for the pipette to completely remove all the liquid, leading to a higher risk of cell suspension contamination.

Figure 1:
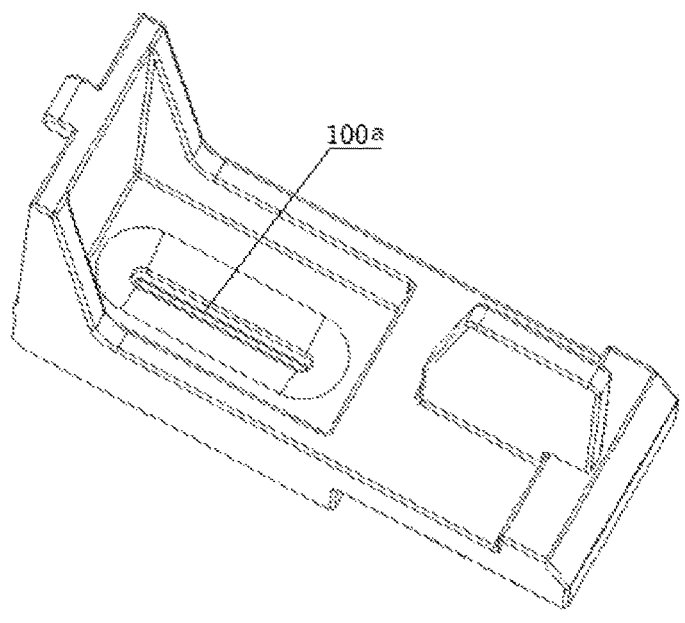
FIG. 1 shows a three-dimensional schematic structural diagram of a printing base in the prior art.

| Reference Numerals | |
| --- | --- |
| 100a | Open inlet |
| 100, 110 | fluid inlet channel |
| 200 | fluid outlet channel |
| 300 | storage slot |
| 400 | waste tank |
| 500 | printing chip |
| 600 | chip inlet port |
| 700 | spray holes |

DETAILED DESCRIPTION

The embodiments of the present disclosure will be described below. Those skilled can easily understand other advantages and effects of the present disclosure according to contents disclosed by the specification.

Refer to FIGS. 2-11. It should be noted that the structure, ratio, size, etc. shown in the accompanying drawings in this specification are only used to illustrate the content disclosed in the specification for the understanding and reading of those familiar with this technology, and are not intended to limit the implementation of the present disclosure. Any structural modification, proportional relationship change or size adjustment should still fall within the scope of the present disclosure, given that no effect and objective achievable by the present disclosure are hindered. Terms such as "upper", "lower", "left", "right", "middle", and "a" used in this specification are only for ease of description, and they are not intended to limit the scope of implementation of the present disclosure. Any change or adjustment of corresponding relative relationships without any substantial technical change should be regarded as within the scope of the implementation of the present disclosure.

Embodiment 1

Referring to FIGS. 2 through 8, Embodiment 1 provides a printhead including an internal microfluidic channel.

The printhead includes a printing base, which includes a fluid inlet channel 100, a fluid outlet channel 200, and a storage slot 300, wherein the fluid inlet channel 100 and the fluid outlet channel 200 are in communication with the storage slot 300.

The printhead further includes a printing chip 500, where the printing chip 500 is encapsulated on a first surface of the printing base, and the printing chip 500 is communicated with the storage slot 300 to form the internal microfluidic channel. A holding volume of the internal microfluidic channel is equal to a volume of printing liquid loaded into the printhead for one charge.

Specifically, through the fluid inlet channel 100, the fluid outlet channel 200, and the storage slot 300 provided in the printing base, the internal microfluidic channel can be formed between the printing base and the printing chip 500, and used for storing the printing liquid. After a certain duration, the printing fluid within the printhead, such as cells in a cell suspension, begins to settle, rendering it unsuitable for printing, at which time new printing liquid can be added to the internal microfluidic channel by connecting a liquid addition device, such as a pipette, to the fluid inlet channel 100. Because the holding volume of the internal microfluidic channel is equal to the volume of printing liquid loaded into the printhead for one charge, old printing liquid will be pushed out via the fluid outlet channel 200 when the new printing liquid is loaded into the internal microfluidic channel, thereby discharging the old printing liquid from the fluid outlet channel 200, i.e., discharging the waste liquid. This embodiment can solve the problem that the printing liquid, especially the cell suspension, settles over time due to gravity and is difficult to be discharged from the printing base, so that the printing quality can be improved.

As an example, the printing base further includes a waste tank 400 communicated with the fluid outlet channel 200, and the waste tank 400 and the printing chip 500 are disposed on opposite surfaces of the printing base.

Figure 5:
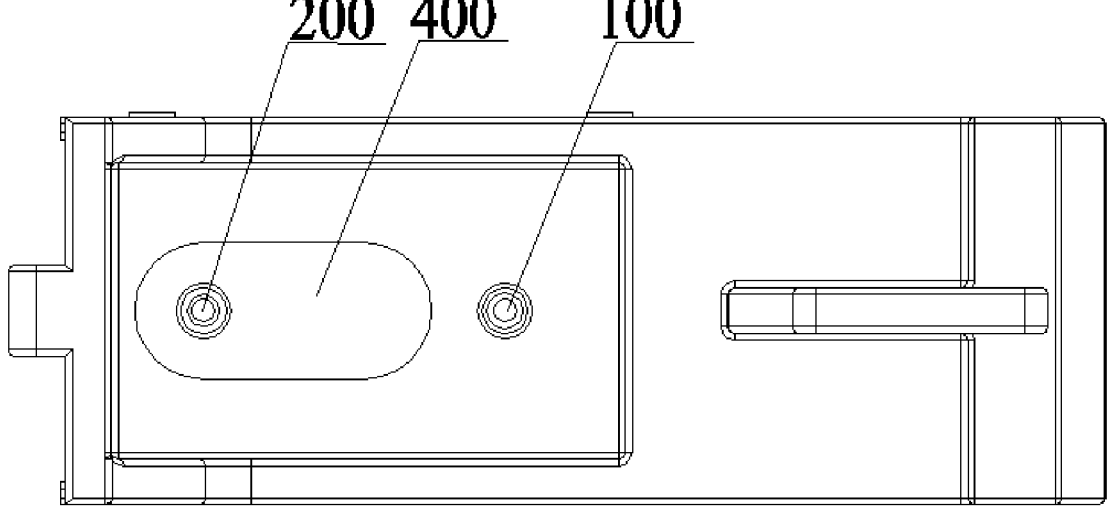
FIG. 5 is a top view of the printing base according to Embodiment 1 of the present disclosure.
Figure 6:
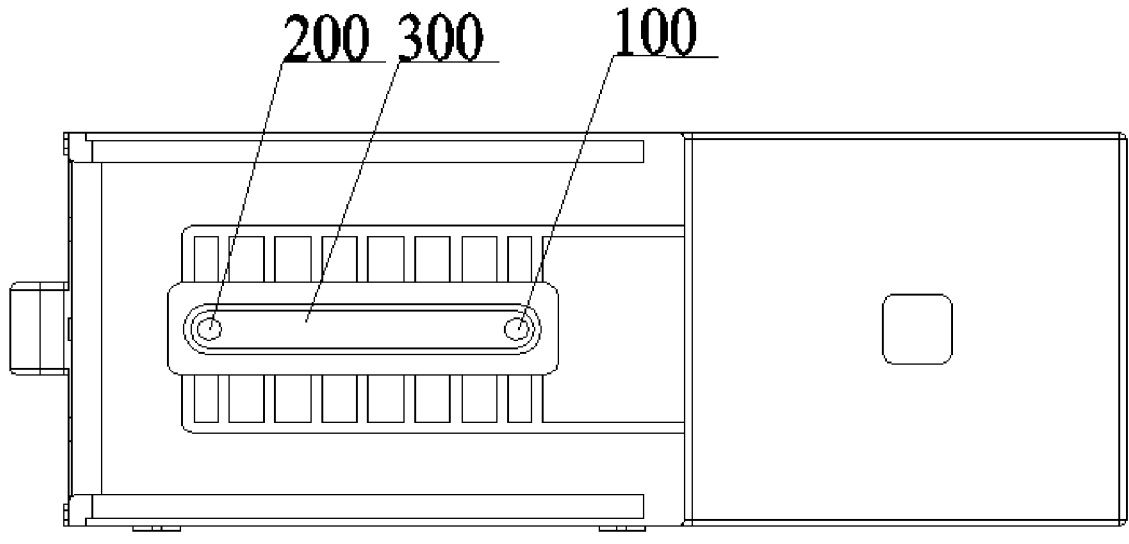
FIG. 6 is bottom view of the printing base according to Embodiment 1 of the present disclosure.

Specifically, as shown in FIG. 5, the waste tank 400 and the printing chip 500 are disposed on opposite surfaces of the printing base, and the waste tank 400 is used to hold waste liquid discharged from the fluid outlet channel 200, thereby facilitating treatment of the waste liquid; the fluid outlet channel 200 may also be directly communicated with a discharge pipe for discharging the waste liquid.

As an example, the fluid inlet channel 100 is located outside the waste tank 400 and the fluid outlet channel 200 is located inside the waste tank 400. That is, as an example, the fluid outlet channel 200 extends into the waste tank 400, and the entirety of the fluid inlet channel 100 is external to the waste tank 400. In this way, the fluid inlet channel 100 is kept away from the waste tank 400 to avoid contamination of the fluid inlet channel 100.

Figure 2:
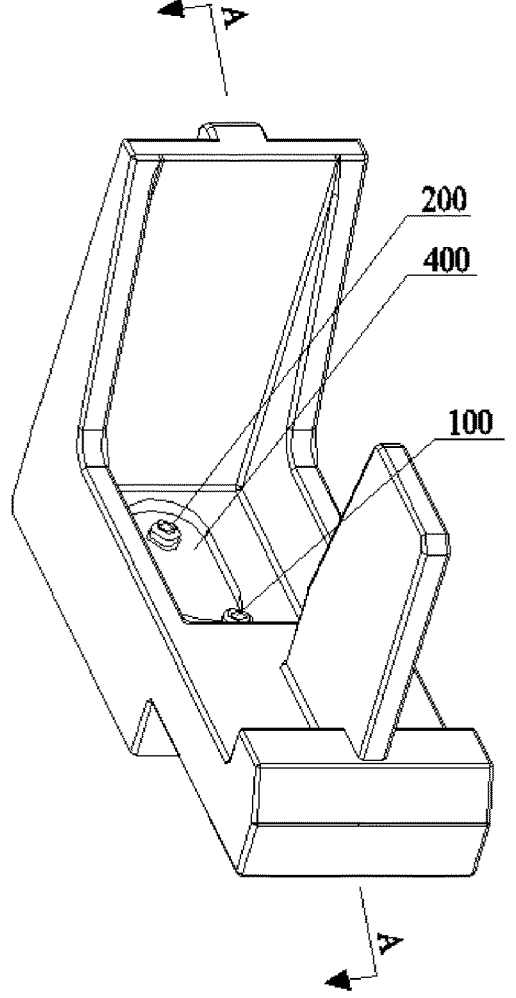
FIG. 2 shows a three-dimensional schematic structural diagram of a printing base according to Embodiment 1 of the present disclosure.
Figures 3, 4:
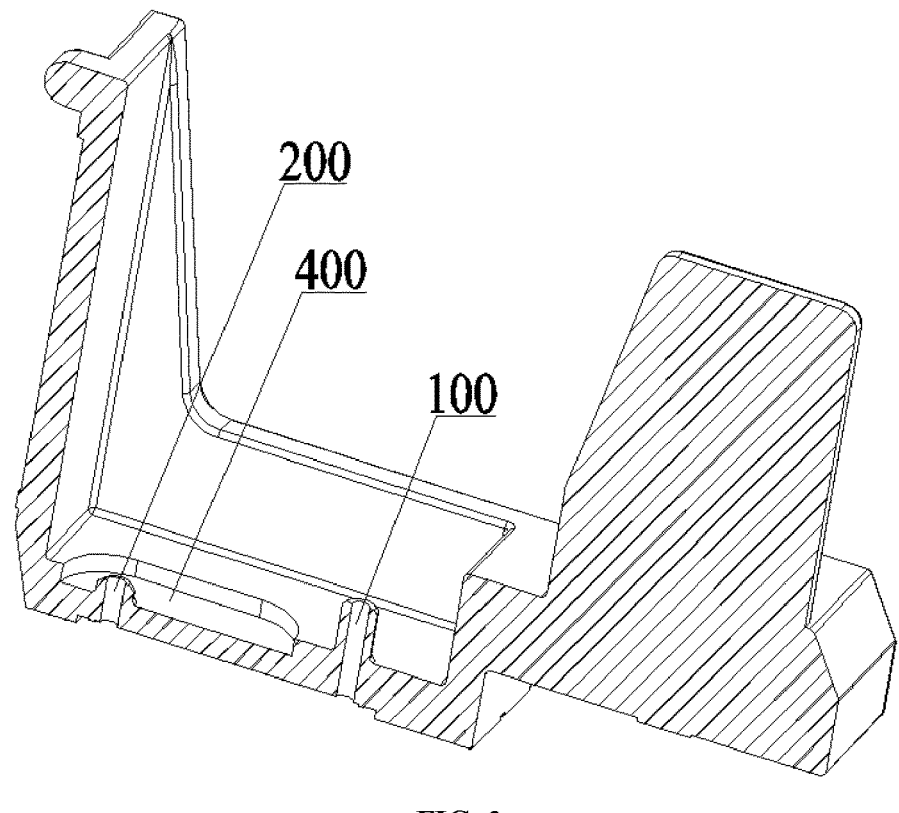
FIG. 3 is a cross-sectional view of the printing base in FIG. 2 with the cutting plane passing through A-A.
FIG. 4 is a front view of the printing base according to Embodiment 1 of the present disclosure.

Specifically, as shown in FIGS. 2 to 4, in one example, an inlet end surface of the fluid inlet channel 100 is not lower than an outlet end surface of the fluid outlet channel 200, and the fluid inlet channel 100 and the fluid outlet channel 200 are arranged along an axis of the printhead in the horizontal direction The outlet end surface of the fluid outlet channel 200 is not higher than the upper end of the waste tank 400, and the inlet end surface of the fluid outlet channel 200 is flush with the lower end of the waste tank 400. The outlet end surface of the fluid inlet channel 100 is flush with the lower end of the waste tank 400, so that the fluid inlet channel 100 has a higher inlet end surface, which helps avoid contamination due to liquid reflux, but the positional relationship between the fluid outlet channel 200 and the fluid inlet channel 100 is not limited thereto.

As an example, the internal microfluidic channel has a holding volume of 10 μL to 30 μL (e.g., 10 μL, 15 μL, 20 μL, 25 μL, 30 μL). Specifically, due to the small depth of the storage slot 300, the internal microfluidic channel is only capable of storing only about 10 μL~30 μL of printing liquid. Typically, printing fluid, such as cell suspensions, can be quite costly, and due to gravity, these suspensions tend to settle, leading to wastage if too much is added at once. The printhead is designed to hold a specific volume of fluid, usually between 10 μL and 30 μL, for each print cycle. By introducing the internal microfluidic channel, the amount of printing fluid used can be significantly reduced, thereby lowering costs.

Figure 7:
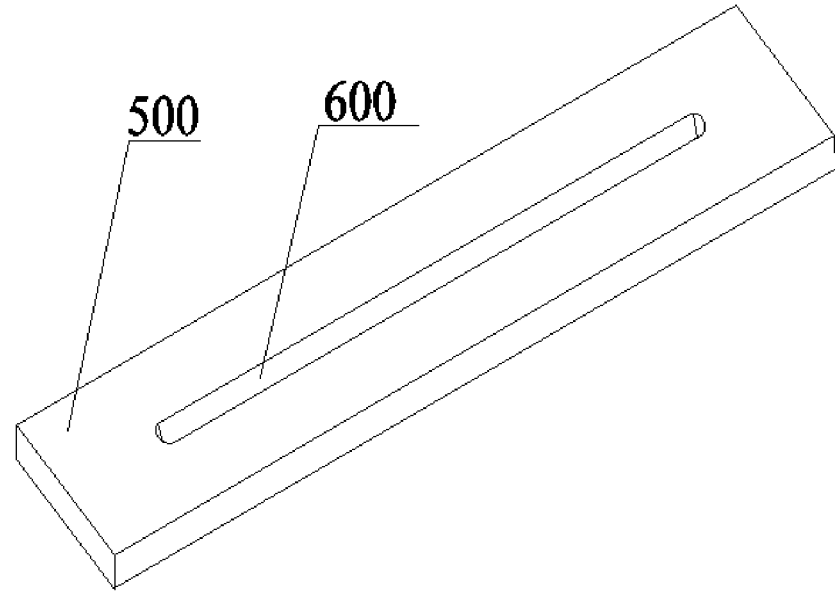
FIG. 7 shows a three-dimensional schematic structural diagram of a printing chip of the present disclosure from a first perspective.
Figure 8:
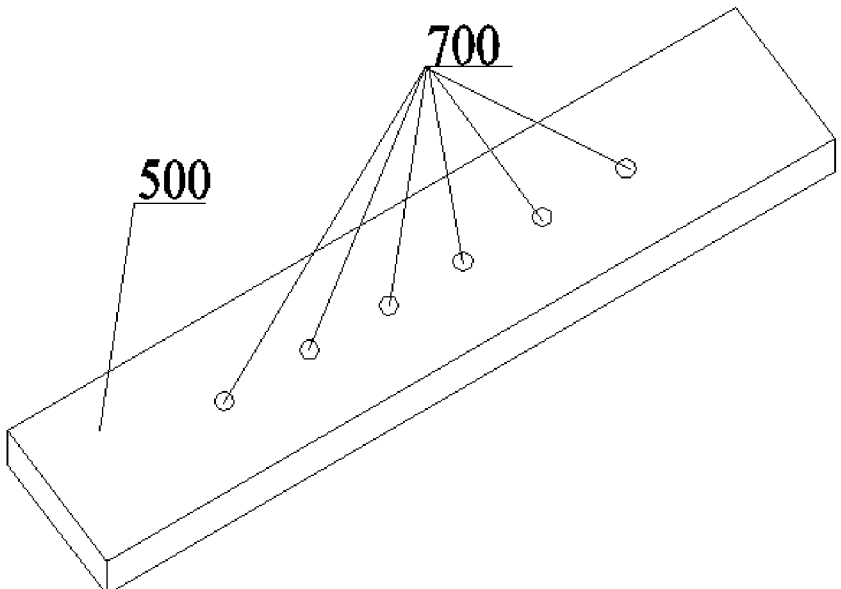
FIG. 8 shows a three-dimensional schematic structural diagram of the printing chip of the present disclosure from a second perspective.
Figure 9:
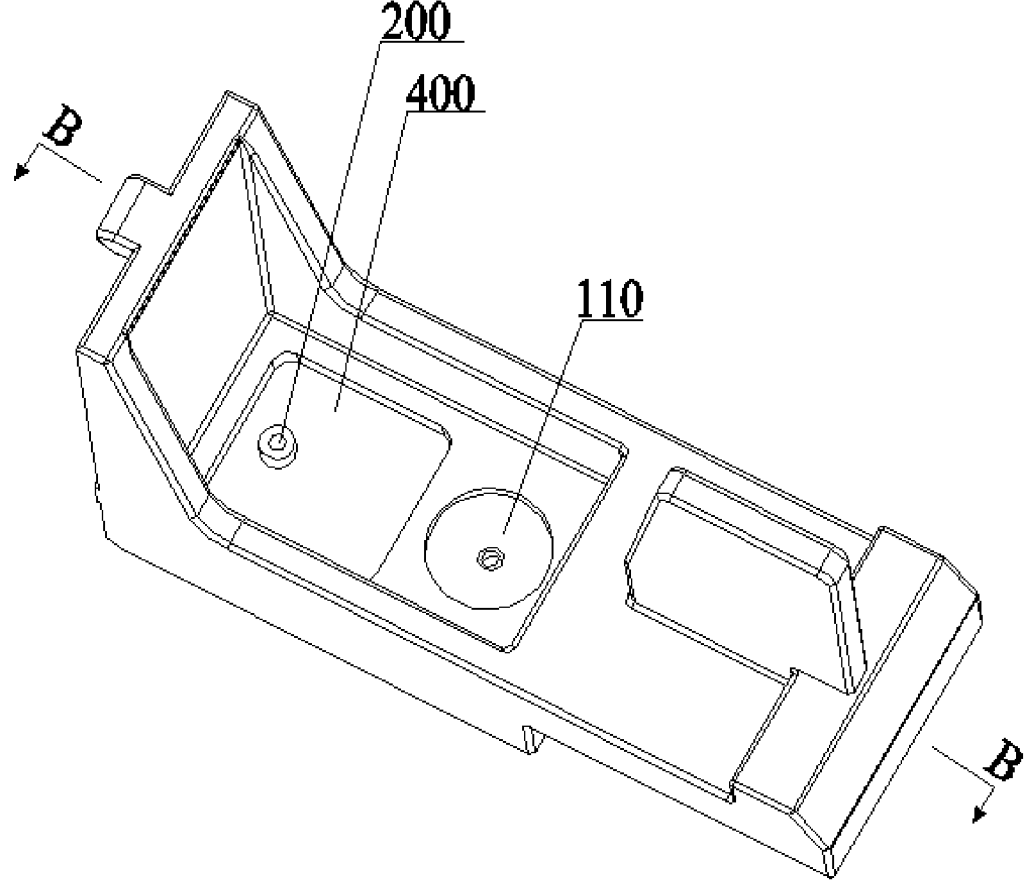
FIG. 9 shows a three-dimensional schematic structural diagram of a printing base according to Embodiment 2 of the present disclosure.

As an example, as shown in FIGS. 7 and 8, the printing chip 500 is a rectangular sheet, the printing chip 500 includes a first surface and a second surface opposite to the first surface, a chip inlet port 600 is formed on the first surface of the printing chip 500 and extends along a length direction of the printing chip 500, and the chip inlet port 600 is communicated with the internal microfluidic channel. A plurality of spray holes 700 are formed on the second surface of the printing chip 500, arranged in a row at equal spacing along the length direction, and communicated with the chip inlet port 600. The printing liquid in the internal microfluidic channel arrives at the plurality of spray holes 700 after flowing through the chip inlet port 600. The specific shape of the printing chip 500 is not unduly limited herein.

As an example, the printing chip 500 is a thermal bubble inkjet printing chip.

Specifically, the printing chip 500 may be a thermal bubble inkjet printing chip made of silicon. Thermal bubble inkjet printing employs a method known as thermal bubbling, which involves heating the printhead to create bubbles in the ink, which is then propelled onto the printing medium. It's a technique that operates under high-temperature and high-pressure conditions. Its working principle is as follows: under normal circumstances, the ink inside the nozzle achieves a relative balance with the external atmospheric pressure under the action of surface tension, and is in a stable state; when the nozzle receives a printing signal, the heating element inside the nozzle (such as a thin film resistor) quickly heats up, causing the ink near the heating element to rapidly increase in temperature and vaporize, forming countless tiny bubbles, and the small bubbles gather and expand to form a steam film. When the printing signal disappears, the residual heat from the heating element causes the bubbles to expand further, generating internal pressure pushing the ink out of the nozzle, while the temperature of the heating element begins to drop. As the surface temperature of the heating element decreases, the boundary between the bubbles and the ink starts to cool, at which time the front part of the ink has been squeezed out from the nozzle, and the back part of the ink has shrunk, reducing the internal pressure of the nozzle and creating a negative pressure at the nozzle, which then draws the ink back into the nozzle. When the bubbles inside the nozzle disappear, the negative pressure continues to act, causing ink droplets to separate completely from the nozzle, and the remaining ink is sucked back into the nozzle. Surface tension then creates an outward suction that pulls new ink to replenish the ink ejection area in preparation for the next cycle of printing. Thereby, when removing waste liquid from the printhead, the printing chip 500 and the printing base form a closed holding space therebetween so that liquid can be fed through the inlet port of the fluid inlet channel 100 and discharged from the outlet port of the fluid outlet channel 200.

As an example, the fluid inlet channel 100 has a circular inlet port with a diameter of 0.5 mm to 1.5 mm (e.g. 0.5 mm, 0.8 mm, 1.0 mm, 1.2 mm, 1.5 mm).

As an example, the fluid inlet channel 100 is connected to a pipette for manual filling, or the fluid inlet channel 100 is connected to a liquid supply system, where the liquid supply system is electrically connected to a controller, and the controller is configured to control automatic filling of the fluid inlet channel 100 by the liquid supply system.

Specifically, FIG. 2 shows a three-dimensional schematic structural diagram of the printing base; the fluid inlet channel 100 has a circular inlet port, and the circular inlet port has external and/or internal threads, which improves sealing performance when the pipette or the liquid supply system is docked to the fluid inlet channel 100. When the pipette is used for manual filling or the liquid supply system is used for automatic filling, the pressure increases, and a one-way flow path is formed between the fluid inlet channel 100 and the fluid outlet channel 200 to discharge old printing liquid entirely in one go.

Embodiment 2

Referring to FIGS. 7 to 11, Embodiment 2 provides another printhead including an internal microfluidic channel, and the difference between Embodiment 2 and Embodiment 1 mainly lies in the unique shape of the inlet port of the fluid inlet channel 110. For a detailed breakdown of the printhead's structure, please refer to Embodiment 1. The following will focus on the differences from Embodiment 1.

As an example, the fluid inlet channel 100 has a funnel-shaped inlet port with a cylindrical upper part and a conical lower part.

As an example, the fluid inlet channel 110 is connected to a pipette for manual filling.

Figures 10, 11:
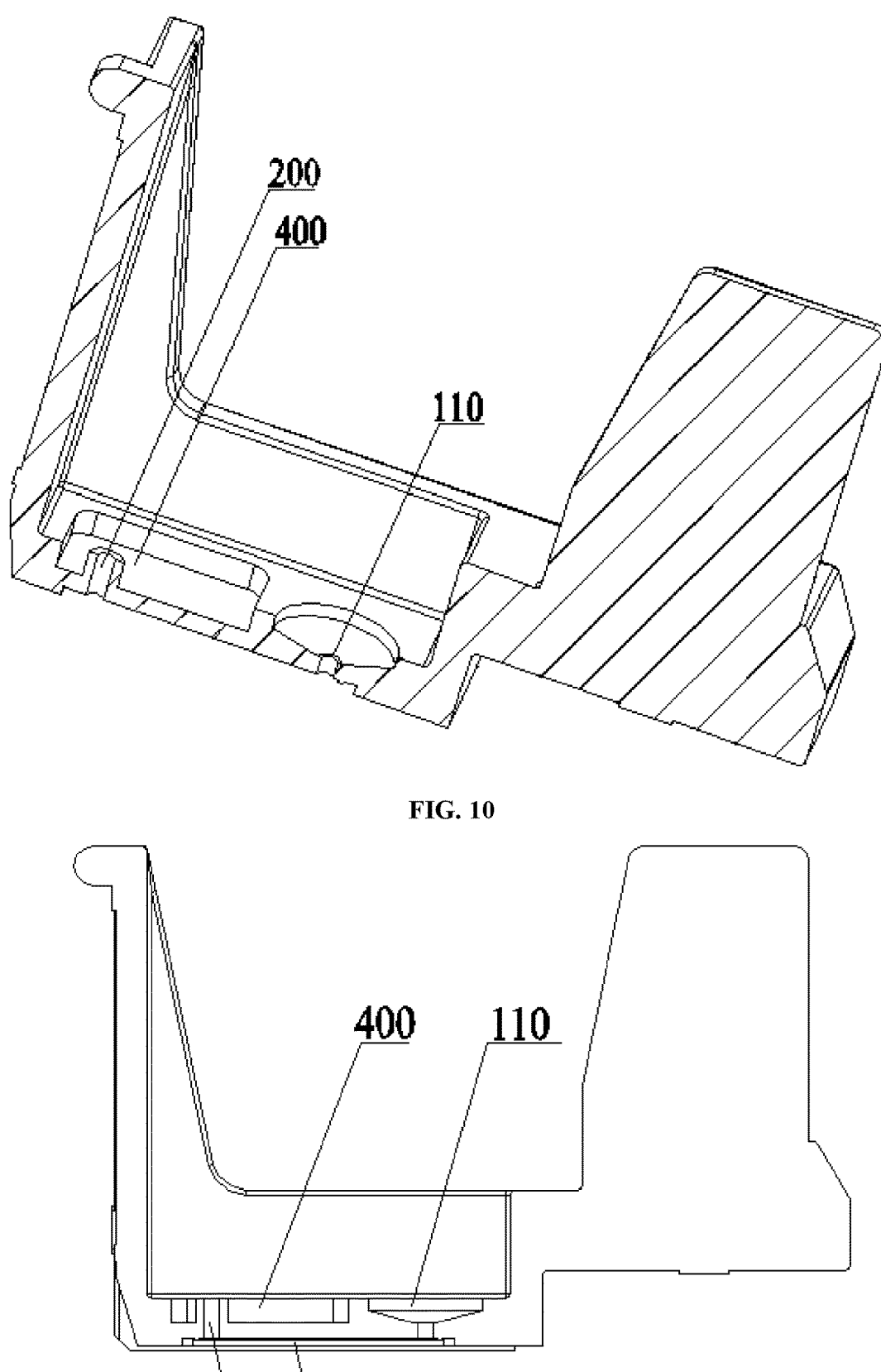
FIG. 10 is a cross-sectional view of the printing base in FIG. 9 with the cutting plane passing through B-B.
FIG. 11 is a front view of the printing base according to Embodiment 2 of the present disclosure.

As an example, as shown in FIGS. 10 and 11, the inlet end surface of the fluid inlet channel 110 is located at the bottom end of the conical lower part, i.e., the inlet end surface of the fluid inlet channel 110 is lower than the outlet end surface of the fluid outlet channel 200, and the fluid inlet channel 110 and the fluid outlet channel 200 are arranged along the axis of the printhead in the horizontal direction. This setup makes it easier for the tip of the pipette to align with the fluid inlet port, and ensures a better seal between the fluid inlet channel 110 and the pipette. When the pipette is used for manual filing, a one-way flow path is formed between the fluid inlet channel 110 and the fluid outlet channel 200. Once the printing fluid is initially added, the printer commences its operation. However, after a certain duration, the printing fluid (such as a cell suspension) within the printhead, begins to settle, rendering it unsuitable for printing. When new printing fluid is subsequently added, the old printing liquid is entirely pushed out from the fluid outlet channel 200 in one go, and directly enters a waste tank 400.

In summary, the printhead of the present disclosure contains an internal microfluidic channel formed between the printing chip and the storage slot, and the holding volume of the internal microfluidic channel is equal to a volume of printing liquid loaded into the printhead for one charge. This design ensures that during the fluid discharge process, the old printing fluid is expelled entirely in one go, significantly reducing the chance of contamination, and reducing the difficulty of discharging the printing fluid from the printing base. Moreover, the small holding volume of the internal microfluidic channel prevents wastage of printing fluid, leading to substantial cost savings.

In the present disclosure, the fluid inlet channel is connected to the pipette or the liquid supply system for manual filling or automatic filing of liquid, so that a one-way flow path is formed between the fluid inlet channel and the fluid outlet channel. Once the printing fluid is initially added, the printer commences its operation. However, after a certain duration, the printing fluid (such as a cell suspension) within the printhead begins to settle, rendering it unsuitable for printing. After new printing fluid is subsequently added, the high pressure and rapid flow within this one-way path enhance the fluid discharge rate, due to the relatively small cross-sections of the one-way flow path between the inlet and outlet channels. The present disclosure also addresses issues prevalent in the related technologies where the use of an open printhead leads to sedimentation of cell suspensions over time due to gravity, and the sedimentation makes it difficult and time-consuming to remove the settled solution with a pipette, and furthermore, the small size of the open inlet inside the printhead makes it difficult for the pipette to completely remove all the liquid, leading to a higher risk of cell suspension contamination. Therefore, the present disclosure effectively overcomes various shortcomings in the existing technology and has high industrial utilization value.

The above-mentioned embodiments are merely illustrative of the principle and effects of the present disclosure instead of restricting the scope of the present disclosure. Any person skilled in the art may modify or change the above embodiments without violating the principle of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. A printhead comprising an internal microfluidic channel, wherein the printhead comprises:
  a printing base, comprising a fluid inlet channel, a fluid outlet channel, a waste tank communicated with the fluid outlet channel, and a storage slot, wherein the fluid inlet channel and the fluid outlet channel are in communication with the storage slot; and
  a printing chip, wherein the printing chip is encapsulated on a first surface of the printing base, and the printing chip is communicated with the storage slot to form the internal microfluidic channel, and a holding volume of the internal microfluidic channel ranges from 10 μL to 30 μL;

wherein an inlet end surface of the fluid inlet channel is higher than a lower end of the waste tank, wherein an inlet end surface of the fluid outlet channel is flush with the lower end of the waste tank so that the fluid outlet channel extends into the waste tank.

2. The printhead according to claim 1, wherein the waste tank is disposed on a second surface of the printing base opposite to the first surface.

3. The printhead according to claim 2, wherein the fluid inlet channel is located outside of the waste tank and the fluid outlet channel is located inside of the waste tank.

4. The printhead according to claim 1, wherein the printing chip is a rectangular sheet, and the printing chip comprises a first surface and a second surface opposite to the first surface,
  wherein a chip inlet port is formed on the first surface of the printing chip and extends along a length direction of the printing chip, and the chip inlet port is communicated with the internal microfluidic channel;
  wherein a plurality of spray holes is formed on the second surface of the printing chip, arranged in a row at equal spacing along the length direction, and communicated with the chip inlet port;
  wherein printing liquid in the internal microfluidic channel arrives at the plurality of spray holes after flowing through the chip inlet port.

5. The printhead according to claim 1, wherein the printing chip is a thermal bubble inkjet printing chip.

6. The printhead according to claim 1, wherein the fluid inlet channel has a circular inlet port with a diameter of 0.5 mm to 1.5 mm.

7. The printhead according to claim 6, wherein the fluid inlet channel is connected to a pipette for manual filling, or
  the fluid inlet channel is connected to a liquid supply system, wherein the liquid supply system is electrically connected to a controller, and the controller is configured to control automatic filling of the fluid inlet channel by the liquid supply system.

8. The printhead according to claim 7, wherein the circular inlet port has external and/or internal threads for sealed connection with the pipette or liquid supply system.

9. The printhead according to claim 1, wherein the fluid inlet channel has a funnel-shaped inlet port with a cylindrical upper part and a conical lower part.

10. The printhead according to claim 9, wherein the fluid inlet channel is connected to a pipette for manual filling.

11. The printhead according to claim 1, wherein an inlet end surface of the fluid inlet channel is not lower than an outlet end surface of the fluid outlet channel.

12. The printhead according to claim 1, wherein the printing chip and the printing base form a closed holding space therebetween.

* * * * *